US005516967A

United States Patent [19]

Pandey et al.

[11] Patent Number: 5,516,967
[45] Date of Patent: May 14, 1996

[54] DIRECT CONVERSION OF METHANE TO HYTHANE

[75] Inventors: Raj N. Pandey, Guelph; Kebir Ratnani, Boucherville; Shamsuddlin Ahmed; Rupesh N. Pandey, both of Guelph; John R. Williams, Laval, all of Canada

[73] Assignees: Chemisar Laboratories Inc., Ontario; Gas Metropolitain and Company, Limited, Montreal, both of Canada

[21] Appl. No.: 380,618

[22] Filed: Jan. 30, 1995

[51] Int. Cl.⁶ .................................................... C07C 2/00
[52] U.S. Cl. ................................. 48/198.1; 48/199 FM; 585/943
[58] Field of Search ....................... 585/943; 48/199 FM

[56] References Cited

U.S. PATENT DOCUMENTS

| | | | |
|---|---|---|---|
| 4,057,436 | 11/1977 | Davies et al. | 106/288 Q |
| 4,299,536 | 12/1981 | Moard et al. | 123/3 |
| 5,139,002 | 8/1992 | Lynch et al. | 123/575 |
| 5,207,185 | 5/1993 | Greiner et al. | 123/3 |
| 5,342,702 | 8/1994 | MacGregor | 429/13 |

OTHER PUBLICATIONS

F. E. Lynch and G. J. Egan, Proceedings of the 4th Cdn. Hydrogen Workshop, No. 1–2, 1989.

*Primary Examiner*—Helane Myers
*Attorney, Agent, or Firm*—Foley & Lardner

[57] ABSTRACT

The direct conversion of methane to hythane, an alternative fuel for internal combustion engines, is effected by subjecting methane to a controlled oxidation with water vapor at a temperature of about 400° to about 500° C. and a pressure of about 1 to about 5 atmospheres, in the presence of a catalyst comprising palladium or a binary alloy thereof with another metal selected from the group consisting of elements belonging to Group IB, Group IIA, Group VIII and the lanthanide series of the Periodic Table, the catalyst being supported on a porous carrier. The direct conversion of methane to hythane under conditions of low temperature and pressure in accordance with the present invention enables hythane to be produced not only economically and efficiently, but also at or near vehicle fueling sites, thereby eliminating the storage and transportation of dangerously reactive hydrogen for mixing with methane or natural gas.

20 Claims, 1 Drawing Sheet

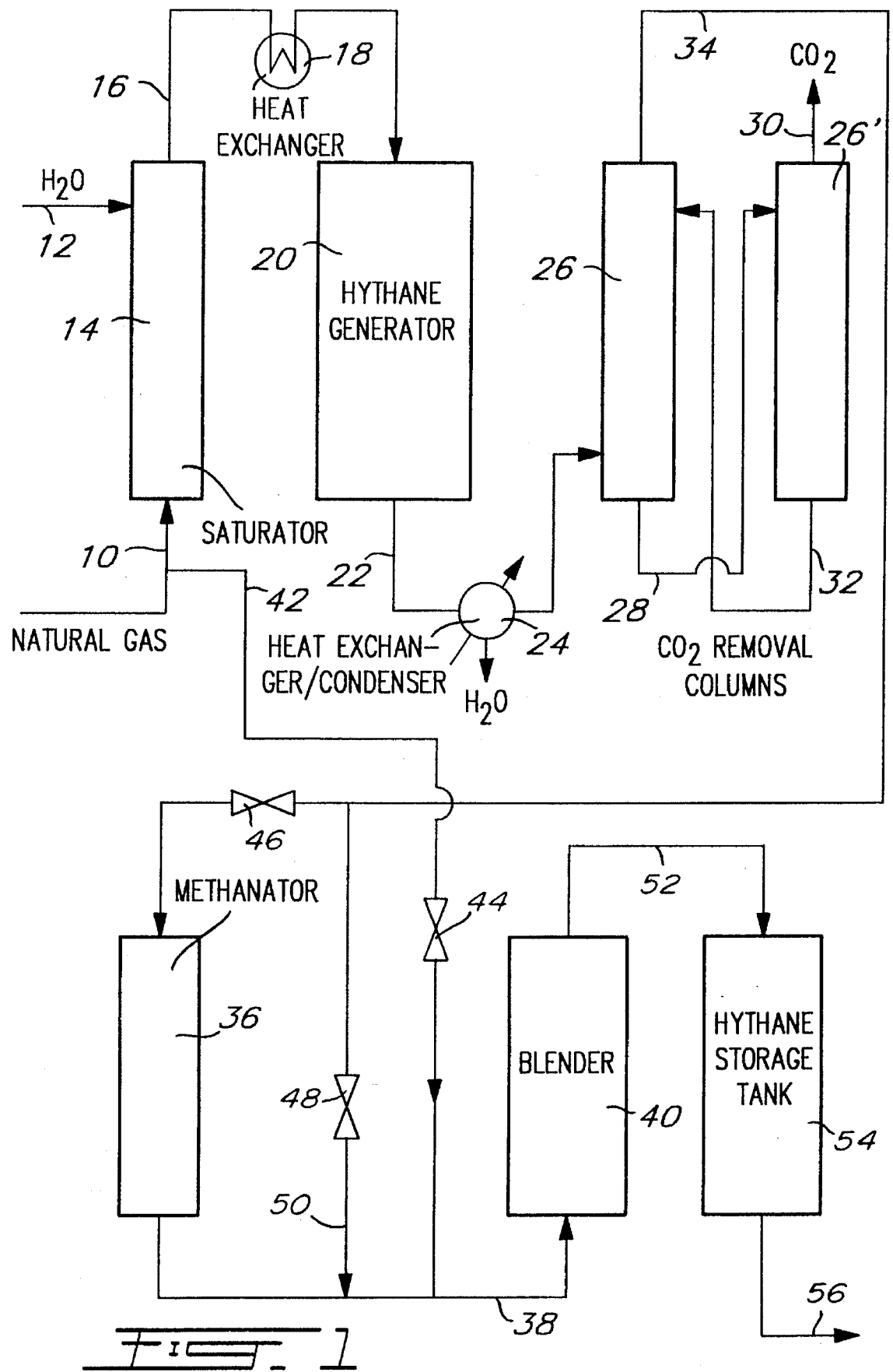

DIRECT CONVERSION OF METHANE TO HYTHANE

BACKGROUND OF THE INVENTION

The present invention relates to a novel process for the efficient and economic production of hythane, an alternative fuel for internal combustion engines. More particularly, the invention relates to a process for the direct conversion of methane to hythane.

The growing regulatory and legislative demands for gradual introduction of pollution-free vehicles in Canada and other industrialized nations of the world have intensified research to find clean burning transportation fuels. Compressed natural gas, methanol and oxygenated fuels are among the leading candidates. Recently, blends of 5–20 vol. % hydrogen and 80–95 vol. % natural gas have been receiving increasing interest. These gaseous mixtures are called "hythane" and have been described by F. E. Lynch et al in U.S. Pat. No. 5,139,002 as having an effective combustion rate similar to that of gasoline, thereby creating a potentially promising substitute for conventional fuels in spark ignition internal combustion engines as well as in compression ignition engines. The pollution emissions from hythane powered vehicles is shown to be well below that of gasoline engines, due to the clean-burning characteristics of the components of hythane (F. E. Lynch and G. J. Egan, Proceedings of the 4th Cdn. Hydrogen Workshop, Nov. 1–2, 1989).

According to the aforementioned U.S. Pat. No. 5,139,002, hythane is produced by blending natural gas and hydrogen in desired proportions. Natural gas is a cheap and abundantly available material. However, this is not the case with hydrogen. At present, hydrogen is principally obtained by an energy- and capital- intensive natural gas steam reforming technology. The process operating under extreme conditions of temperature (>900° C.) and pressure (>20 atmospheres) produces a mixture of $H_2$, CO and $CO_2$, having a $H_2$/CO ratio of about 3 to 5, and containing typically about 15% CO. The main purpose of steam reforming process is to produce syngas. The production of CO-free hydrogen from such a reactor effluent or product mixture requires either separation of hydrogen by membrane diffusion technology or conversion of CO to $CO_2$ by a shift conversion process under operating conditions vastly different from the primary steam reforming process. Either of these processes adds substantial cost to the already expensive catalytic steam reforming process. Because of such complexity of the overall manufacturing process, hydrogen is an expansive commodity. As a result, $CH_4$—$H_2$ blends have high prices as well. The situation is further worsened by the requirements of cryogenic storage and transportation of the dangerously reactive hydrogen for mixing with methane or natural gas.

SUMMARY OF THE INVENTION

It is therefore an object of the present invention to provide an efficient and economic process for the direct conversion of methane to hythane.

In accordance with the invention, there is thus provided a process for the production of hythane, which comprises subjecting methane to a controlled oxidation with water vapor at a temperature of about 400° to about 500° C. and a pressure of about 1 to about 5 atmospheres, in the presence of a catalyst comprising palladium or a binary alloy thereof with another metal selected from the group consisting of elements belonging to Group IB, Group IIA, Group VIII and the lanthanide series of the Periodic Table, the catalyst being supported on a porous carrier.

Applicant has found quite unexpectedly that by using the above catalyst methane or natural gas can be converted directly to hythane under controlled conditions of low temperature and pressure. The absence of severe temperature and pressure conditions keeps the capital and operating costs of the process of the invention within reasonable limits.

The expression "controlled oxidation" as used herein refers to an oxidation reaction which is carried out in the presence of the above catalyst and under the above controlled conditions of low temperature and pressure so that the reaction proceeds to the desired $H_2$ and $CH_4$ contents in the gaseous product mixture obtained, corresponding to the composition of hythane.

The main reactions occurring during the controlled oxidation of methane with water vapor in accordance with the present invention are as follows:

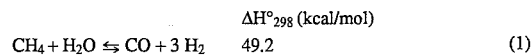
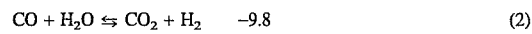

The transformation of methane or natural gas to hythane does not require high conversion of $CH_4$, but demands a minimal production of CO. This is achieved in accordance with the invention by carrying out controlled oxidation of $CH_4$ with $H_2O$ at low reaction temperature of 400°–500° C., where forward water gas shift reaction (reaction (2) above) is thermodynamically favoured. The catalyst used according to the invention also exhibits the desired dual properties of (a) moderate activity for the $CH_4$—$H_2O$ reaction and (b) high activity for the water gas shift reaction. Under these conditions, the CO produced by reaction (1) is converted to $CO_2$ and $H_2$ by reaction (2).

Examples of suitable catalysts which may be used in accordance with the present invention include Pd, Pd-Ni, Pd-Cu, Pd-Mg, Pd-La and Pd-Ce supported on a porous carrier such as alumina, silica or zirconia. Palladium supported on γ-alumina is particularly preferred. The loadings of the catalytically active components on the carrier can vary between about 0.5 and about 10% by weight, based on the total weight of the supported catalyst.

According to a preferred embodiment of the invention, an inert porous material such as γ-alumina is admixed with the supported catalyst to prevent excessive catalyst cooling (due to the endothermicity of reaction (1) above) by serving as heat reservoir. Preferably, the inert porous material is used in an amount of about one to two-fold the mass of supported catalyst.

The composition of the hythane produced by the process of the invention can be varied by adjusting the process conditions in terms of $CH_4$/$H_2O$ feed ratio, dry gas feed flowrate, catalyst mass and reaction temperature and pressure. As already indicated above, the reaction is carried out at a temperature in the range of about 400°–500° C. and a pressure in the range of about 1–5 atmospheres. An increase in the reaction temperature has the effect of producing a hydrogen rich hythane fuel, whereas an increase in the reaction pressure decreases the overall conversion of methane, thereby producing a hythane fuel with a lower hydrogen content. The $CH_4$/$H_2O$ feed ratio and dry gas feed flowrate, on the other hand, preferably range from about 2 to about 5 and from about 20 to about 100 ml (NTP)/min., respectively. A $CH_4$/$H_2O$ feed ratio of about 3.5 and a dry gas feed flowrate of about 25 ml/min. are preferred. The mass of supported catalyst may vary within a range of about 0.2 to about 1 g. An increase in the partial pressure of water vapor in the feed has the effect of producing a hydrogen rich hythane fuel, whereas an increase in the catalyst mass or dry gas feed flowrate increases the conversion of methane and thus increases the hydrogen content of the fuel.

The process of the invention has the distinct advantage of offering significant cost savings over conventional processes for hythane production such as those based on producing hydrogen by electrolysis of water or by multistep high temperature-high pressure steam reforming of methane, followed by blending of hydrogen with natural gas. The direct conversion of methane to hythane under conditions of low temperature and pressure in accordance with the present invention enables hythane to be produced not only economically and efficiently, but also at or near vehicle fueling sites, thereby eliminating the storage and transportation of dangerously reactive hydrogen for mixing with methane or natural gas.

BRIEF DESCRIPTION OF THE DRAWINGS

Further features and advantages of the invention will become more readily apparent from the following description of a preferred embodiment as illustrated by way of example in the accompanying drawing, in which:

FIG. 1 is a flow diagram of a process for producing hythane according to the invention.

DESCRIPTION OF PREFERRED EMBODIMENTS

In the process which is schematically illustrated in FIG. 1, purified natural gas and water are fed via feed lines 10 and 12, respectively, to a saturator 14 for saturating the natural gas with water vapor. The water saturated gas stream which is discharged via line 16 is passed through a heat exchanger 18 for preheating the gas stream to a temperature of 300°–350° C., and then sent to a hythane generator 20 consisting of a downflow reactor containing a fixed catalyst bed maintained at a temperature of 400°–450° C. As the preheated gas stream enters into the reactor 20, it is heated to the operating temperature of the reactor in order to avoid cooling of the catalyst bed and thereafter passed through the catalyst bed. The transformation of the natural gas to hythane is carried out in the reactor 20 operating at 1 atmosphere absolute and 400°–450° C. The reactor effluent which is discharged via line 22 consists of a gaseous mixture containing methane, hydrogen and small quantities of carbon oxides and unreacted water vapor; in terms of $CH_4$ and $H_2$, the reactor effluent has a composition corresponding to that of hythane fuel.

The hythane-containing gas stream is passed through a heat exchanger/condenser 24 for recovering useful heat and condensing out excess water vapor, and then sent to $CO_2$ towers 26,26'. The removal of $CO_2$ from the hythane-containing gas stream can be accomplished by one of several standard processes, for example, by scrubbing with a monoethanolamine (MEA) solution. The hythane-containing gas stream passes through a $CO_2$ absorption tower 26 where $CO_2$ is absorbed at ambient temperature by MEA solution. The spent MEA solution is sent via line 28 to a stripper tower 26' where the absorbed $CO_2$ is separated from the scrubbing liquor by warming and discharged via line 30 to the atmosphere. The regenerated MEA solution is recycled via line 32 to tower 26.

The gas stream leaving the $CO_2$ absorption tower 26 is sent via line 34 to a catalytic methanator 36 for converting residual carbon monoxide to methane. The methanation is usually carried out over a silica supported nickel catalyst maintained at a temperature of 300°–350° C. The methanator effluent which is discharged via line 38 and contains only $CH_4$ and $H_2$ is sent to a blender 40. If the $CH_4/H_2$ ratio in the hythane fuel thus produced is lower than desired, the ratio can be adjusted in the blender by adding make-up natural gas via line 42 and opening valve 44. On the other hand, if the residual carbon monoxide in the gas stream leaving the $CO_2$ absorption tower 26 is within permissible limits, the methanation step can be bypassed as a cost-saving measure by closing valve 46 and opening valve 48 so as to send the gas stream directly to the blender 40 via lines 34, 50 and 38. After blending, the gaseous mixture of $CH_4$ and $H_2$ is sent via line 52 to a storage tank 54 for ultimate fueling of automobiles or the like via line 56.

The following non-limiting examples further illustrate the invention.

EXAMPLE 1

A Pd/γ-$Al_2O_3$ catalyst containing 2.0 wt. % Pd was prepared by incipient wetness impregnation of a γ-alumina support (20–40 mesh) with an aqueous solution of palladium chloride, followed by drying at 120° C.

A microreactor was packed with an admixture of 0.2 gram of the above catalyst with 0.3 gram of inert γ-$Al_2O_3$ and placed in a continuous flow system. Prior to the start of the reaction, the mixture of Pd/γ-$Al_2O_3$ catalyst and inert γ-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 400° to 450° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 1.

TABLE 1

| Reaction Temperature | Reactor effluent composition (vol. %) | | | | $H_2$/CO (v/v) ratio in effluent |
|---|---|---|---|---|---|
| (°C.) | $CH_4$ | $H_2$ | CO | $CO_2$ | |
| 400 | 89.2 | 9.0 | 0.40 | 1.41 | 22 |
| 425 | 83.4 | 13.5 | 0.78 | 2.33 | 17 |
| 450 | 76.7 | 18.9 | 1.37 | 3.06 | 14 |

EXAMPLE 2

A Pd-Ni/γ-$Al_2O_3$ catalyst containing 2.0 wt. % Pd and the requisite loading of Ni to give a Pd/Ni atomic ratio of 1 was prepared by incipient wetness impregnation of a γ-alumina support (20–40 mesh) with an aqueous solution of palladium chloride and nickel nitrate hexahydrate, followed by drying at 120° C.

A microreactor was packed with an admixture of 0.2 gram of the above catalyst with 0.3 gram of inert $\gamma$-$Al_2O_3$ and placed in a continuous flow system. Prior to the start of the reaction, the mixture of Pd-Ni/$\gamma$-$Al_2O_3$ catalyst and inert $\gamma$-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 400° to 450° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 2.

TABLE 2

| Reaction Temperature | Reactor effluent composition (vol. %) | | | | $H_2$/CO (v/v) ratio |
|---|---|---|---|---|---|
| (°C.) | $CH_4$ | $H_2$ | CO | $CO_2$ | in effluent |
| 400 | 92.0 | 6.5 | 0.21 | 1.24 | 31 |
| 425 | 83.2 | 13.5 | 0.56 | 2.51 | 24 |
| 450 | 76.6 | 18.9 | 1.14 | 3.29 | 17 |

EXAMPLE 3

A Pd-Cu/$\gamma$-$Al_2O_3$ catalyst containing 2.0 wt. % Pd and the requisite loading of Cu to give a Pd/Cu atomic ratio of 1 was prepared by incipient wetness impregnation of a $\gamma$-alumina support (20–40 mesh) with an aqueous solution of palladium chloride and copper (+2) nitrate trihydrate, followed by drying at 120° C.

A microreactor was packed with an admixture of 0.2 gram of the above catalyst with 0.3 gram of inert $\gamma$-$Al_2O_3$ and placed in a continuous flow system. Prior to the start of the reaction, the mixture of Pd-Cu/$\gamma$-$Al_2O_3$ catalyst and inert $\gamma$-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 450° to 500° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 3.

TABLE 3

| Reaction Temperature | Reactor effluent composition (vol. %) | | | | $H_2$/CO (v/v) ratio |
|---|---|---|---|---|---|
| (°C.) | $CH_4$ | $H_2$ | CO | $CO_2$ | in effluent |
| 450 | 94.6 | 4.5 | 0.31 | 0.51 | 15 |
| 475 | 87.1 | 10.3 | 0.91 | 1.53 | 11 |

TABLE 3-continued

| Reaction Temperature | Reactor effluent composition (vol. %) | | | | $H_2$/CO (v/v) ratio |
|---|---|---|---|---|---|
| (°C.) | $CH_4$ | $H_2$ | CO | $CO_2$ | in effluent |
| 500 | 79.2 | 16.9 | 1.50 | 2.43 | 11 |

EXAMPLE 4

A Pd-Mg/$\gamma$-$Al_2O_3$ catalyst containing 2.0 wt. % Pd and the requisite loading of Mg to give a Pd/Mg atomic ratio of 1 was prepared by incipient wetness impregnation of a $\gamma$-alumina support (20–40 mesh) with an aqueous solution of palladium chloride and magnesium nitrate hexahydrate, followed by drying at 120° C.

A microreactor was packed with an admixture of 0.2 gram of the above catalyst with 0.3 gram of inert $\gamma$-$Al_2O_3$ and placed in a continuous flow system. Prior to the start of the reaction, the mixture of Pd-Mg/$\gamma$-$Al_2O_3$ catalyst and inert $\gamma$-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 400° to 450° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 4.

TABLE 4

| Reaction Temperature | Reactor effluent composition (vol. %) | | | | $H_2$/CO (v/v) ratio |
|---|---|---|---|---|---|
| (°C.) | $CH_4$ | $H_2$ | CO | $CO_2$ | in effluent |
| 400 | 91.2 | 7.2 | 0.86 | 0.71 | 8.4 |
| 425 | 85.8 | 11.6 | 1.32 | 1.38 | 8.8 |
| 450 | 80.0 | 16.1 | 1.80 | 2.04 | 8.9 |

EXAMPLE 5

A Pd-La/$\gamma$-$Al_2O_3$ catalyst containing 2.0 wt. % Pd and the requisite loading of La to give a Pd/La atomic ratio of 1 was prepared by incipient wetness impregnation of a $\gamma$-alumina support (20–40 mesh) with an aqueous solution of palladium chloride and lanthanum nitrate hexahydrate, followed by drying at 120° C.

A microreactor was packed with an admixture of 0.2 gram of the above catalyst with 0.3 gram of inert $\gamma$-$Al_2O_3$ and placed in a continuous flow system. Prior to the start of the reaction, the mixture of Pd-La/$\gamma$-$Al_2O_3$ catalyst and inert $\gamma$-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 400° to 450° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 5.

TABLE 5

| Reaction Temperature | Reactor effluent composition (vol. %) | | | | $H_2/CO$ (v/v) ratio |
|---|---|---|---|---|---|
| (°C.) | $CH_4$ | $H_2$ | CO | $CO_2$ | in effluent |
| 400 | 90.4 | 7.9 | 0.77 | 0.92 | 10 |
| 425 | 82.0 | 14.8 | 0.96 | 2.24 | 15 |
| 450 | 76.4 | 19.0 | 1.41 | 3.19 | 13 |

EXAMPLE 6

A Pd-Ce/γ-$Al_2O_3$ catalyst containing 2.0 wt. % Pd and the requisite of Ce to give a Pd/Ce atomic ratio of 1 was prepared by incipient wetness impregnation of a γ-alumina support (20–40 mesh) with an aqueous solution of palladium chloride and cerium nitrate hexahydrate, followed by drying at 120° C.

A microreactor was packed with an admixture of 0.2 gram of the above catalyst with 0.3 gram of inert γ-$Al_2O_3$ and placed in a continuous flow system. Prior to the start of the reaction, the mixture of Pd-Ce/γ-$Al_2O_3$ catalyst and inert γ-$Al_2O_3$ was calcined at 500° C. under $N_2$ flow for 2 hours, followed by a reduction at 500° C. under hydrogen flow for 2 hours. A feed stream consisting of a mixture of $CH_4$ (43.9 vol. %), water vapor (12.5 vol. %) and $N_2$ (43.6 vol. %) was passed over the catalyst bed; the $CH_4/H_2O$ feed ratio was thus about 3.5. The nitrogen added to the feed acted as an internal standard. The flow of dry gas at the reactor inlet was maintained approximately at 25 ml/min., the pressure in the reactor being maintained at about 1 atmosphere. The reaction temperature (bed temperature) was varied from 400° to 450° C. The reactor effluent stream was analyzed for reactants and products ($N_2$, $CH_4$, CO, $CO_2$, $H_2O$ and $H_2$) by TCD - gas chromatography. The composition of the reactor effluent (dry gas basis excluding internal standard) for the selected temperatures is reported in Table 6.

TABLE 6

| Reaction Temperature | Reactor effluent composition (vol. %) | | | | $H_2/CO$ (v/v) ratio |
|---|---|---|---|---|---|
| (°C.) | $CH_4$ | $H_2$ | CO | $CO_2$ | in effluent |
| 400 | 88.9 | 9.2 | 0.59 | 1.32 | 16 |
| 425 | 80.9 | 15.6 | 0.90 | 2.52 | 17 |
| 450 | 74.7 | 20.6 | 1.42 | 3.30 | 15 |

We claim:

1. A process for the production of a gaseous mixture comprising about 5–20 vol. % hydrogen and about 80–95 vol. % methane, which comprises oxidizing methane with water vapor at a temperature of about 400° to about 500° C. and a pressure of about 1 to about 5 atmospheres, in the presence of a catalyst comprising palladium or a binary alloy thereof with another metal selected from the group consisting of elements belonging to Group IB, Group IIA, Group VIII and the lanthanide series of the Periodic Table, the catalyst being supported on a porous carrier.

2. A process as claimed in claim 1, wherein said oxidation is carried out at atmospheric pressure.

3. A process as claimed in claim 1, wherein said oxidation is carried out at a temperature ranging from about 400° to about 450° C.

4. A process as claimed in claim 1, wherein said catalyst is selected from the group consisting of palladium, alloys of palladium-nickel, palladium-copper, palladium-magnesium, palladium-lanthanum and palladium-cerium.

5. A process as claimed in claim 1, wherein said carrier is selected from the group consisting of alumina, silica and zirconia.

6. A process as claimed in claim 1, wherein said catalyst comprises palladium supported on γ-alumina.

7. A process as claimed in claim 1, wherein said catalyst comprises about 0.5 to about 10% by weight of palladium or of said binary alloy thereof, based on the total weight of the supported catalyst.

8. A process as claimed in claim 1, wherein said catalyst comprises about 2% by weight of palladium, based on the total weight of the supported catalyst.

9. A process as claimed in claim 4, wherein said catalyst comprises an alloy of palladium with another metal selected from the group consisting of nickel, copper, magnesium, lanthanum and cerium, in which palladium is present in an amount of about 2% by weight, based on the total weight of the supported catalyst, and wherein said alloy has a palladium/other metal atomic ratio of about 1.

10. A process as claimed in claim 1, wherein the supported catalyst is used in admixture with an inert porous material.

11. A process as claimed in claim 10, wherein said inert porous material comprises γ-alumina.

12. A process as claimed in claim 1, wherein said oxidation is carried out at atmospheric pressure with a $CH_4/H_2O$ feed ratio ranging from about 2 to about 5, a dry gas feed flowrate ranging from about 20 to about 100 ml/min., and a mass of supported catalyst ranging from about 0.2 to about 1 g.

13. A process as claimed in claim 12, wherein said $CH_4/H_2O$ feed ratio is about 3.5.

14. A process as claimed in claim 12, wherein said dry gas feed flowrate is about 25 ml/min.

15. A process as claimed in claim 12, wherein said mass of supported catalyst is about 0.2 g.

16. A process as claimed in claim 12, wherein said supported catalyst is used in admixture with an inert porous material.

17. A process as claimed in claim 16, wherein said inert porous material comprises γ-alumina.

18. A process as claimed in claim 16, wherein said inert porous material is used in an amount of about one to two-fold the mass of supported catalyst.

19. A process as claimed in claim 12, wherein said oxidation is carried out at a temperature ranging from about 400° to about 500° C.

20. A process as claimed in claim 12, wherein said catalyst comprises palladium supported on γ-alumina.

* * * * *

UNITED STATES PATENT AND TRADEMARK OFFICE
CERTIFICATE OF CORRECTION

PATENT NO. : 5,516,967
DATED : May 14, 1996
INVENTOR(S) : Raj N. Pandey

It is certified that error appears in the above-indentified patent and that said Letters Patent is hereby corrected as shown below:

On the title page item [73], should read -- Raj Narain Pandey and Gas Metropolitain and Company, Limited Partnership. --

Signed and Sealed this

Twenty-ninth Day of July, 1997

Attest:

BRUCE LEHMAN

*Attesting Officer*   *Commissioner of Patents and Trademarks*